July 29, 1924.
M. T. FISHER
COOKING CHART
Filed April 17, 1922   3 Sheets-Sheet 1
Fig. 1.
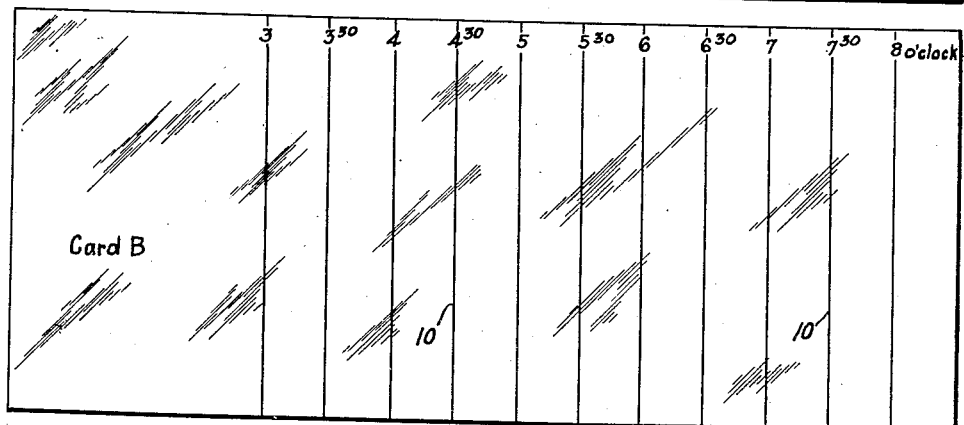
Fig. 2.
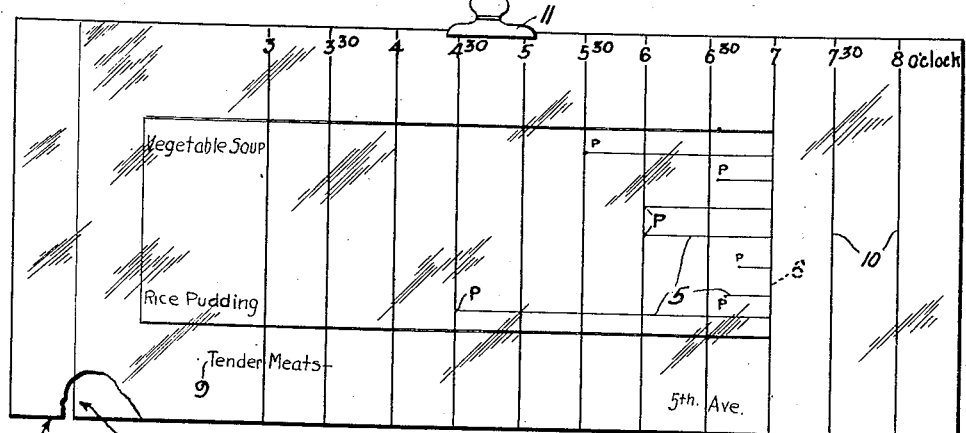
Fig. 3.
INVENTOR
Martin T. Fisher July 29, 1924.
M. T. FISHER
COOKING CHART
Filed April 17, 1922    3 Sheets-Sheet 2
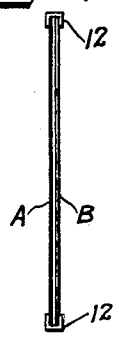
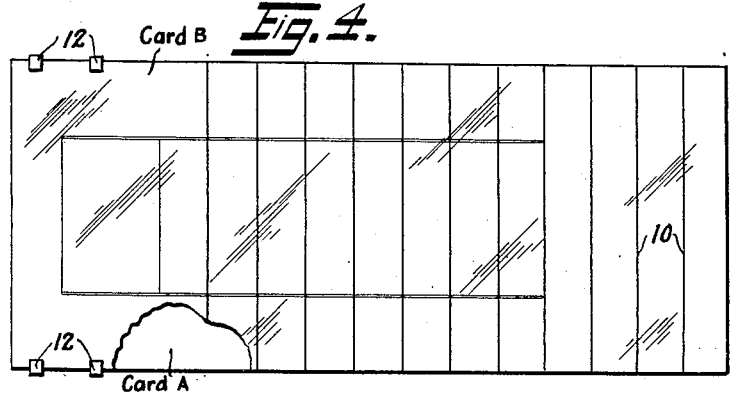
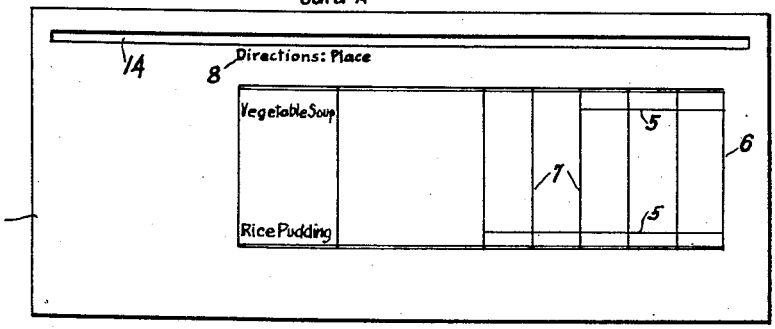
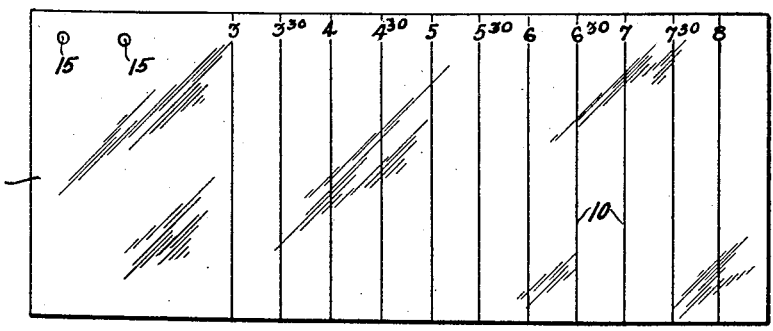
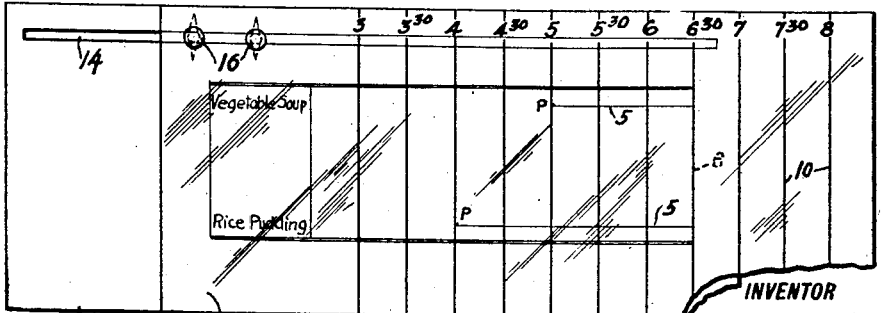

July 29, 1924.

M. T. FISHER

COOKING CHART

Filed April 17, 1922　　3 Sheets-Sheet 3

1,502,850

Fig. 9.

| | | | 6 hrs. | 5 | 4 | 3 | 2 | 1 hr. |
|---|---|---|---|---|---|---|---|---|
| Soups | Meat Stock Soup | 6 hrs. | | | | | | |
| | Vegetable Soup | 1½ hrs. | | | | | P | |
| | Clam Chowder | 1 hr. | | | | | | |
| | Pea Soup | ¾ hr. | | | | | | |
| Fish | Fish, boiled | ½ hr. | | | | | | |
| | Fish, broiled | 20 min. | | | | | | |
| | Planked Shad | 25 min. | | | | | | |
| Green Veg. | Beets | 1 hr. | | | | | P | 5 |
| | Asparagus | 25 min. | | | | 10 | 10 | |
| | Spinach | 25 min. | | | | | | |
| | Green Corn | 15 min. | | | | | | |
| Starchy Veg. | Baked Potatoes | 1 hr. | | | | | | |
| | Boiled Potatoes | 25 min. | | | | | | |
| | Macaroni | 25 min. | | | | | | |
| | Rice | 20 min. | | | | | | |
| Meats | Boiled Ham | 4-5 hrs. | 14 lbs. | 12 lbs. | | | | |
| | Boiled Leg Mutton | 3 hrs. | | | | | | |
| | Roast Beef rare | 1-1½ hrs. | | | | | 10lbs. | 5lbs. |
| | " " well done | 1½-2 hrs. | | | | | 10lbs. | 5lbs. |
| | Roast Lamb | 1½ hrs. | | | | | | |
| | Roast Pork | 3½ hrs. | | | P | | | |
| | Chicken, boiled | 1 hr. | | | | | 5 | |
| | Chicken, broiled | 20 min. | | | | | | |
| | Steak, broiled | 6-8 min. | | | | | | |
| | Baked Beans | 6 hrs. | | | | | | |
| Breads | Biscuits | 15 min. | | | | | | |
| | Muffins | 20 min. | | | | | | |
| | Loaf Bread | 1 hr. | | | | | | |
| Desserts | Rice Pudding | 2¼ hrs. | | | | P | | |
| | Bread Pudding | 1 hr. | | | | | | |
| | Pie | 40 min. | | | | | | |

(Advertising Matter)

Card A

INVENTOR

Martin T. Fisher

Patented July 29, 1924.

1,502,850

UNITED STATES PATENT OFFICE.

MARTIN T. FISHER, OF NEW YORK, N. Y.

COOKING CHART.

Application filed April 17, 1922. Serial No. 553,896.

*To all whom it may concern:*

Be it known that I, MARTIN T. FISHER, a citizen of the United States, and resident of New York city, New York, have invented a new and useful Cooking Chart, of which the following is a specification.

This invention is a cooking chart, for indicating at what hour the cooking of various articles of food should be commenced so that each article will be done at approximately the dinner hour. A young housekeeper is sometimes embarrassed by the fact that when the time to serve dinner has arrived, she finds all the articles, except one, are done and ready to be served. Due to the fact that that article was not put on in time, the meal may be unduly delayed. This chart tells the cook at just what hour the several articles of food should be put on the stove so that each will be done at the right time, in spite of the different cooking times involved. It is, of course, adjustable, so as to accommodate itself to a varying dinner hour.

Since the chart is brought to the attention of the housekeeper fairly frequently, it furnishes a good advertising medium; therefore it may be advisable to put advertising matter on the chart, although this is optional.

The invention comprises essentially two cards. The first card has a list of foods thereon; that list, for instance, may be an ordinary dinner menu, including soup, fish, meat, vegetables and dessert. Opposite each article of food is a heavy horizontal line— heavy so as to be readily visible—the length of which is proportional to the length of time it takes that particular article to cook; for instance, if roast beef takes one and one half hours to cook, the line opposite this item might be one and one half inches long. The right hand ends of the horizontal lines just mentioned all terminate in the same vertical line.

The second card is ruled in vertical parallel lines, regularly spaced apart, the spaces between the lines representing a certain period of time, laid off on the same scale as the horizontal lines on the first card. These vertical lines are numbered corresponding to the five or six hours preceding the dinner hour; and if, on the first card, one inch corresponds to one hour, then on the second card, the 5 o'clock line would be one inch from the 6 o'clock line.

One of the cards—preferably the second card, with the vertical lines on it—is transparent, so that one card may be superposed on the other, and indicia on both cards read at the same time. However, either of the cards could be made transparent. The manner of using the two cards is fully explained in the subsequent description.

The card with the list of foods thereon may have the menu for only one dinner on it; that is, it would have one soup, one fish, one roast, etc. If this is the case, the housekeeper would be supplied with fifty or one hundred, say, such cards, for different menus. However, it is within the contemplation of the invention to have only one food card, with a fairly large list of the most used articles of food on it, suitably grouped; in this aspect of the invention, such card would include, say, four soups, three kinds of fish, four kinds of green vegetables, etc., and this one card would be used instead of the fifty or one hundred cards above mentioned. This single card would have a transparent hour-reading card associated with it, as before. However, such a card, with its long list of foods and the respective horizontal lines opposite each article, would be useful by itself in a kitchen, in that the horizontal lines graphically indicate the cooking times, thereby lessening the necessity of consulting the cook book; such sole use is within the scope of the invention.

Referring now to the drawings, illustrating several embodiments of the invention, Fig. 1 shows a food card; Fig. 2 the hour-indicating card; Fig. 3 shows one card superposed on the other, as in use; Fig. 4 is a view similar to Fig. 3 of a modified way of holding the cards together; Fig. 5 is an end view of Fig. 4; Figs. 6 and 7 are views respectively of a food card and hour-indicating card, in a modified form; Fig. 8 shows the cards of Figs. 6 and 7 in use; and Fig. 9 is a modified food card with a longer list of foods thereon.

In Fig. 1, card A is the food card; it has on it a list of foods comprising an ordinary dinner menu; opposite each article of food is a horizontal line 5 the length of which is proportional to the time it takes that article to cook; that is, if roast beef requires one hour, the line opposite it would be, say, one inch long. The lines 5 are so drawn that the right hand end of each of these lines terminates in the vertical line 6, preferably printed in red. The left hand end of each horizontal line 5 is marked P. Vertical lines 7 are printed on this card, spaced apart on the same time-indicating scale as the lines 5, that is, say one inch corresponding to one hour. This card may have directions 8 and advertising matter 9 printed thereon. It also may have the cooking times printed in words, as shown.

In Fig. 2, card B is the hour-indicating card; it is preferably of celluloid or other transparent material and is provided with vertical lines 10 ruled thereon, spaced apart for indicating the hours immediately preceding the dinner hour, laid off on the same scale as the horizontal lines 5 on card A.

Fig. 3 illustrates the manner of using the two cards. If it is desired to have dinner at, say, 7 o'clock, card B is put over card A so that the 7 o'clock line on card B coincides with the red line 6 on card A; then points P, on card A, when read with respect to card B, will indicate the time to start cooking the respective articles of food. That is, the soup should be started at 5.30, etc. The two cards may be held in any desired adjusted position by a spring clamp 11 or similar device.

In Fig. 4, cards B and A are superposed as before and are slidably connected to each other by a plurality of U-shaped guide elements 12, such guide elements being fastened to one of the cards and slidably engaging over the edge of the other, as shown in Fig. 5.

In Figs. 6 and 7, cards B and A are marked as before. One of the cards, such as A, is provided with a long slot 14, while the other, B, has two holes 15 in it. In use, a pair of fastening elements 16, here shown as ordinary paper fasteners, are passed through holes 15 and slot 14, whereby the two cards are held in sliding engagement.

Fig. 9 indicates a food card, A′, which, instead of including only a dinner menu, includes a relatively long list of foods, suitably grouped, and provided with horizontal and vertical lines 5 and 7 as in Fig. 1. In this case, a single card A′ only is used, instead of a number of cards for different dinners, as is the case in Fig. 3. This card A′ may have associated with it an hour indicating card similar to card B, Fig. 2. However, this card A′ is usable by itself as giving a graphic indication of cooking times, by the lines 6 thereon, thereby lessening the necessity of referring to the cook book.

While the invention has been shown in several forms, it should be understood that such showing is only illustrative and more or less diagrammatic, and that the inventive idea may be carried out in other ways.

While the lines on card A are preferably horizontal, and those on card B vertical, this arrangement could evidently be reversed; the point is that the lines on the one card be at right angles to the lines on the other card.

I claim as my invention:—

1. A cooking chart, comprising a card with a list of foods thereon, a horizontal line opposite each article of food the length of which is proportional to the time it takes that article to cook, and a second card with vertical lines thereon spaced apart for indicating the periods of time, one of the cards being transparent, superposable on, and relatively movable with respect to, the other card.

2. A cooking chart, comprising a card with a list of foods thereon, a horizontal line opposite each article of food the length of which is proportional to the time it takes that article to cook, the right hand ends of these horizontal lines all terminating on the same vertical line, and a second card, with vertical lines thereon spaced apart for indicating periods of time and numbered for indicating certain hours of the day, laid off on the same time-indicating scale as the lines on the first card, one of the cards being transparent, superposable on and movable with respect to, the other card.

3. A cooking chart, comprising a card with a list of foods thereon, a horizontal line opposite each article of food the length of which is proportional to the time it takes that article to cook, a second card with vertical lines thereon spaced apart for indicating periods of time, one of the cards being transparent, superposable on, and relatively movable with respect to, the other card, and means for holding the two cards in any desired adjusted position.

4. A cooking chart, comprising a card with a list of foods thereon, a horizontal line opposite each article of food the length of which is proportional to the time it takes for that article to cook, the right hand ends of each of the horizontal lines terminating in the same vertical line.

5. A cooking chart, comprising a card with a list of foods thereon, a horizontal line opposite each article of food the length of which is proportional to the time it takes for that article to cook, the right hand ends of each of the horizontal lines terminating in the same vertical line, and vertical lines on said card, spaced apart for indicating definite periods of time, crossing said horizontal lines.

6. A cooking chart comprising a card with a list of foods thereon, a line opposite each article of food the length of which is proportional to the time it takes that article to cook, a second card with regularly spaced lines thereon for indicating periods of time, one of the cards being transparent and relatively movable with respect to the other card, the two cards being superposable so that the lines on the one card are substantially at right angles to the lines on the other.

MARTIN T. FISHER.